Patented June 26, 1934

1,964,518

UNITED STATES PATENT OFFICE 1,964,518

INSECTICIDE AND/OR FUNGICIDE

George M. Karns, Pittsburgh, Pa., assignor to Iodine Educational Bureau, Inc., a corporation of New York No Drawing. Application May 9, 1931, Serial No. 536,307

3 Claims. (Cl. 167—17)

This invention is found in an insecticide and/or fungicide suitable to be applied to plants, to effect the destruction of the lower forms of plant and/or animal life of such sorts as commonly occur as parasites upon plants, and the destruction of their spores and/or eggs as well. The active principle of the article of this invention is free elemental iodine.

Although iodine is known to be a powerful agent for the destruction of such forms of life as those indicated, its use in application to plants has heretofore been impracticable, for iodine is an element of extremely volatile and active nature; and, in order to have the continuing effect of free iodine in any particular area or region upon a growing plant, it would, with such knowledge as has heretofore been available, have been necessary to provide initially a body of iodine in solid state of such high concentration and in such quantity as to be dangerous to the plant host whose parasites were to be destroyed.

I have discovered that certain mixtures of substances will, under exposure to the atmosphere, undergo slow chemical reaction, with the gradual liberation of free iodine; and that these mixtures, sprayed or dusted upon plants may be used effectively and without injury (and even with benefit in other respects) to the plant, to accomplish the end in view.

There are iodine compounds of positive valence which, in association with appropriate reducing agents, will act in the desired manner and afford the desired result; and there are iodine compounds of negative valence which, in association with appropriate oxidizing agents, will serve similarly. As compounds of positive valence. I contemplate the iodates, the hypoiodites, and the periodates: for examples, the iodates and the periodates of barium, of potassium, of calcium, and of other metals. As reducing agents, I may use sulphur and compounds of sulphur or an iodide—the iodide of potassium, for example,— or a sulphite—the sulphite of potassium, for example. Specifically, I preferably mix finely divided sulphur and calcium iodate, in the ratio of 15:1. This mixture may be applied to the plant either by dusting or by spraying. Being applied and continuing under atmospheric conditions, reaction with the release of free iodine in minute but effective quantities will occur and will continue during several days. The mixture has no deleterious effect upon the plant. To the contrary, sulphur is itself directly and immediately effective to like ends to those here in contemplation; and the presence of the relatively small quantity of iodate, while constituting the source of iodine, as described, still does not prevent the sulphur from exerting its normal and salutary effect. If the sulphur be derived from by-product sources, it will have associated with itself sulphur compounds of reducing character, and these will tend rather to hasten the essential reaction in its initial stages.

Iodine compounds of negative valence suitable to my purpose are the iodides of sodium, potassium, calcium, barium, and other metals. Oxidizing agents suitable for use in association with an iodide are, for examples, sodium nitrite, potassium dichromate, and sodium or potassium iodate. Intimate mixtures of these substances, being applied in the manner described, will, under atmospheric influence, undergo reaction, with the slow release of free iodine in sufficient quantities to effect the end in view, and that during prolonged intervals of time.

Instead of associating the last-named class of iodine compounds, the compounds of negative valence—the iodides, for example—with oxidizing agents, they may be associated with substances which, being present, promote, catalytically, oxidation in air, with the consequence and effect of releasing free iodine in proper quantities and at proper rate and for proper length of time to attain my ends in practical degree. Among such catalysts are salts of tervalent chromium: chromium sulphate and chromium chloride. The iodide of potassium, for example, in intimate mixture with such a substance and applied in the manner indicated, will, in the open air, undergo reaction, with the release of iodine and the accomplishment of the end described.

I claim as my invention:

1. The method herein described of treating a plant to effect the destruction of parasites which consists in applying to the plant surfaces a mixture in solid state of an iodine compound and reaction-expediting material, the applied mixture, under atmospheric influence, undergoing reaction slowly to release free iodine.

2. The method herein described of treating a plant to effect the destruction of parasites which consists in applying to the plant surfaces a mixture of a metallic iodate and sulphur, the applied mixture, under atmospheric influence, undergoing reaction slowly to release free iodine.

3. A preparation for treating plants and freeing them of parasites consisting of a mixture in solid state of an iodine compound and reaction-expediting material susceptible, under the influence of the atmosphere, to reaction with the slow release of free iodine.

GEORGE M. KARNS.